US009813562B1

(12) United States Patent
Gorman et al.

(10) Patent No.: US 9,813,562 B1
(45) Date of Patent: Nov. 7, 2017

(54) DUAL TONE MULTI-FREQUENCY TRANSCODING SERVER FOR USE BY MULTIPLE SESSION BORDER CONTROLLERS

(75) Inventors: Pierce Andrew Gorman, Lee's Summit, MO (US); Eric Michael Bloomcamp, Olathe, KS (US); Wen Xue, Overland Park, KS (US); Russell E. Huntsman, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 908 days.

(21) Appl. No.: 12/873,957

(22) Filed: Sep. 1, 2010

(51) Int. Cl.
*H04M 7/00* (2006.01)
*H04M 7/12* (2006.01)
*H04L 29/06* (2006.01)

(52) U.S. Cl.
CPC ....... *H04M 7/006* (2013.01); *H04L 29/06027* (2013.01); *H04L 29/06326* (2013.01); *H04M 7/1295* (2013.01)

(58) Field of Classification Search
CPC ........ H04L 29/06027; H04L 29/06326; H04M 7/006
USPC ................. 370/352–356, 260, 389
See application file for complete search history.

(56) References Cited

U.S. PATENT DOCUMENTS

| | | | |
|---|---|---|---|
| 2004/0258063 A1* | 12/2004 | Raith et al. | 370/389 |
| 2005/0009519 A1* | 1/2005 | Murai et al. | 455/432.2 |
| 2005/0083912 A1* | 4/2005 | Afshar et al. | 370/352 |
| 2005/0188111 A1* | 8/2005 | Armstrong et al. | 709/245 |
| 2006/0133513 A1* | 6/2006 | Kounnas | 375/240.26 |
| 2006/0245574 A1 | 11/2006 | Phelps et al. | |
| 2007/0025546 A1* | 2/2007 | Jabri et al. | 379/386 |
| 2007/0249379 A1* | 10/2007 | Bantukul | 455/466 |
| 2008/0031275 A1* | 2/2008 | Janky et al. | 370/466 |
| 2008/0137650 A1* | 6/2008 | Kumarasamy et al. | 370/356 |
| 2008/0158336 A1* | 7/2008 | Benson et al. | 348/14.08 |
| 2009/0052538 A1* | 2/2009 | Watanabe et al. | 375/240.23 |
| 2012/0076155 A1* | 3/2012 | Kounnas | 370/465 |

OTHER PUBLICATIONS

Siemens AG, et al., "Software Conversion of DTMF Outband Signaling into RFC 2833 for H.323 and SIP," IP.com Prior Art Database, Oct. 25, 2006, 3 pages, IP.com, http://priorartdatabase.com/IPCOM/000140665/#textpreview.

* cited by examiner

*Primary Examiner* — Khaled Kassim (57) ABSTRACT

In a packet communication system, session border controllers receive and process communication packets to detect DTMF signaling. If DTMF signaling is detected, the session border controllers determine if DTMF transcoding is required. If DTMF transcoding is required, the session border controllers transfer DTMF transcoding instructions to a DTMF transcoding server. In response to the transcoding instructions, the DTMF transcoding server transfers transcoded DTMF signaling.

20 Claims, 5 Drawing Sheets

– 1 –
DUAL TONE MULTI-FREQUENCY TRANSCODING SERVER FOR USE BY MULTIPLE SESSION BORDER CONTROLLERS

TECHNICAL BACKGROUND

Dual Tone Multi-Frequency (DTMF) tones correspond to input keys on many communication devices. For example, the # key and the 8 key each have corresponding DTMF tones. In Voice over Internet Protocol (VoIP) communication systems, the DTMF tones are encoded into the VoIP packets. There are various forms of DTMF coding, such as International Telecommunications Union (ITU) G.711, Internet Engineering Task Force (IETF) Request For Comment (RFC) 2833, or Session Initiation Protocol (SIP) Information Messaging. If two communication systems on different sides of a VoIP call use different DTMF coding formats, then the DTMF signals must be transcoded from one DTMF coding format into another.

Session border controllers are located at the entry points of many VoIP networks. The session border controllers provide network security, address translation, and DTMF transcoding, among other features. Unfortunately, DTMF signaling is rarely used on the high volumes of VoIP calls. Thus, the DTMF transcoders sit idle in many session border controllers. In addition, the session border controllers may not support all of the possible DTMF transcoding combinations.

Overview

In a packet communication system, session border controllers receive and process communication packets to detect DTMF signaling. If the DTMF signaling is detected, then the session border controllers determine if DTMF transcoding is required. If the DTMF transcoding is required, then the session border controllers transfer DTMF transcoding instructions to a DTMF transcoding server. In response to the transcoding instructions, the DTMF transcoding server transfers transcoded DTMF signaling.

DETAILED DESCRIPTION

Figure 1:
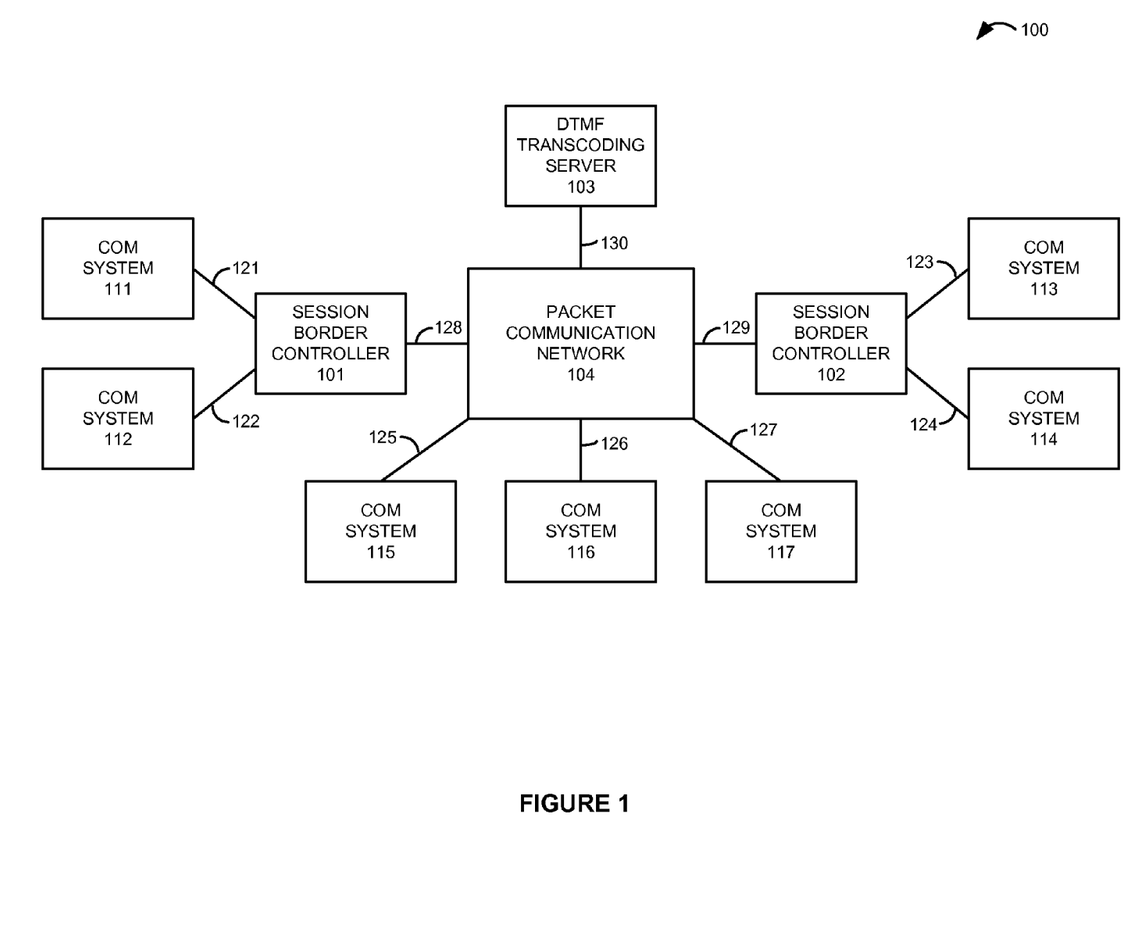
FIG. 1 illustrates a communication system where multiple session border controllers use a DTMF transcoding server.

FIG. 1 illustrates communication system 100. Communication system 100 comprises session border controllers 101-102, DTMF transcoding server 103, packet communication network 104, communication systems 111-117, and communication links 121-130. Session border controller 101 and communication systems 111-112 communicate over respective communication links 121-122. Session border controller 102 and communication systems 113-114 communicate over respective communication links 123-124. Packet network 104 and communication systems 115-117 communicate over respective communication links 125-127. Packet network 104 and session border controllers 101-102 communicate over respective communication links 128-129. DTMF transcoding server 103 and packet network 104 communicate over communication link 130.

Communication systems 111-117 exchange communication packets with one another over session border controllers 101-102, packet network 104, and communication links 121-130. For example, communication systems 111 and 117 might engage in a voice communication session over session border controller 101, packet network 104, and communication links 121, 127, and 128. In another example, communication systems 112 and 114 might engage in a video communication session over session border controllers 101-102, packet network 104, and communication links 122, 124, 128, and 129.

The communication packets for these communication sessions may contain DTMF signaling. For example, a customer in communication system 111 may be in voice communication with a bank in communication system 117. The customer may press the number three key on their telephone to transfer the corresponding DTMF tone and invoke some action during their session with the bank. Communication system 111 will encode the DTMF tone for the three key in DTMF signaling and place this DTMF signaling in a communication packet for the session.

Communication systems 111-117 use various types of DTMF coding, such as G.711, RFC 2833, SIP Info Messaging, or some other form of DTMF coding for communication packets. In some examples, the type of DTMF coding on each end of a communication session is different. In some of these cases, session border controllers 101-102 detect DTMF signaling in the communication packets and transfer corresponding DTMF transcoding instructions to DTMF transcoding server 103. DTMF transcoding server 103 generates and transfers transcoded DTMF signaling in accord with the DTMF transcoding instructions.

For example, communication system 111 might use RFC 2833 for DTMF coding, but communication system 116 might use G.711 for DTMF coding. Session border controller 101 would process a communication packet from communication system 111 to detect DTMF signaling in the RFC 2833 format and determine that the communication packet is destined for communication system 116 that uses the G.711 format. Due to the format mismatch, session border controller 101 would send a transcoding instruction to DTMF transcoding server 103 with various information, such as the target coding format, packet addressing and port numbers, and tokens indicating the desired DTMF tones. DTMF transcoding server 103 would generate communication packet with DTMF signaling based on the transcoding instruction. In the present example, the resulting communication packet would have G.711 encoded DTMF signaling suitable for communication system 116. The G.711 encoded DTMF signaling includes an audio file for each DTMF tone.

In another example, communication system 111 might use SIP information messages for DTMF coding, but communication system 116 might use G.711 for DTMF coding. Session border controller 101 would process a communication packet from communication system 111 to detect DTMF signaling in the SIP Info format and determine that the communication packet is destined for communication system 116 that uses the G.711 format. Due to the format mismatch, session border controller 101 would send a transcoding instruction to DTMF transcoding server 103 with various information, such as the target coding format, packet addressing and port numbers, and tokens indicating the desired DTMF tones. DTMF transcoding server 103 would generate communication packet with DTMF signaling based on the transcoding instruction. In the present example, the resulting communication packet would have G.711 encoded DTMF signaling suitable for communication system 116. The G.711 encoded DTMF signaling includes an audio file for each DTMF tone.

Note the distribution of the DTMF transcoding task in communication system 100. Multiple session border controllers may share a centralized DTMF transcoding server. DTMF transcoding server 103 could support several additional session border controllers, but number shown on FIG. 1 has been restricted for clarity. Advantageously, communication system 100 avoids lightly loaded transcoding components in each border controller, and instead, uses more heavily loaded transcoding components in centralized transcoding server 103. DTMF transcoding server 103 may also provide a more robust set of transcoding combinations.

Figure 2:
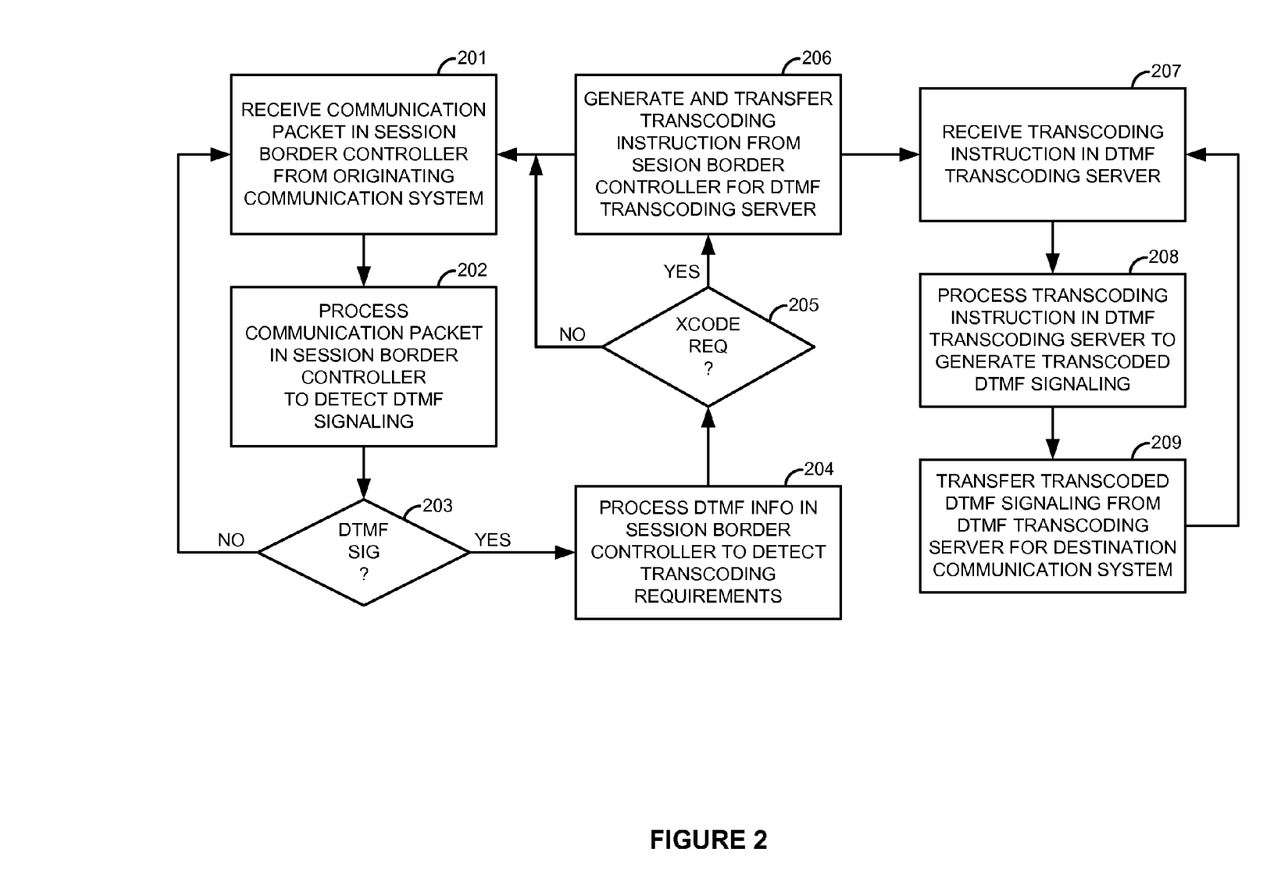
FIG. 2 illustrates the operation of the communication system where the session border controllers use the DTMF transcoding server.

FIG. 2 illustrates the operation of session border controller 101 and DTMF transcoding server 103 in communication system 100. The operation of border controller 102 would be similar. Session border controller 101 receives a communication packet transferred over a communication session between originating communication system 111 and one of destination communication systems 112-117 (201). Session border controller 101 processes the communication packet to detect any DTMF signaling (202). If the DTMF signaling is detected (203), then session border controller 101 processes DTMF information to determine if DTMF transcoding is required for the applicable communication systems (204). For example, session border controller 101 may store a table that indicates the type of transcoding (if any) that is required between the various pairs of communication systems 111-117. In the above example, entering the table with communication systems 111 and 116 would yield a requirement for RFC 2833-to-G.711 transcoding. If DTMF transcoding is required (205), then session border controller 101 generates and transfers a DTMF transcoding instruction for delivery to DTMF transcoding server 103 over communication network 104 and communication links 128 and 130 (206).

DTMF transcoding server 103 receives the DTMF transcoding instruction (207). In response to the instruction, DTMF transcoding server 103 generates transcoded DTMF signaling (208) and transfers the transcoded DTMF signaling for delivery to the destination communication system (209). For example, DTMF transcoding server 103 may transfer a communication packet with the transcoded G.711 DTMF signaling to communication system 116 over communication network 104 and communication links 130 and 126.

Referring back to FIG. 1, session border controllers 101-102 are computer and communication systems that comprise processing circuitry, memory, software, and network communication interfaces. Session border controllers 101-102 may also include routers, codecs, servers, call processors, communication links, and other communication network elements. DTMF transcoding server 103 is a computer and communication system that comprises processing circuitry, memory, software, codecs, and network communication interfaces. DTMF transcoding server 103 may also include routers, call processors, communication links, and other communication network elements. Packet communication network 104 comprises network elements and communication links. Packet communication network 104 may include routers, switches, application servers, and the like. Communication systems 111-117 may comprise a single communication device or multiple communication network elements. Communication systems 111-117 may include wireless base stations, network access points, gateways, routers, switches, call processors, servers, communication links, and the like. Communication links 121-130 use metal, glass, air, space, or some other material as the transport media. Communication links 121-130 may use various communication protocols, such as TDM, IP, Ethernet, wireless, or some other communication format—including combinations thereof. Communication links 121-130 may be direct communication links or may comprise a combination of links, networks, systems, and devices.

Although not shown, DTMF transcoding server 103 may transfer an acknowledgement message back to session border controller 101 after a transcoding instruction is carried out. Session border controller 101 typically purges the original communication packet having the DTMF signaling in response to receiving the acknowledgement message, although the communication packet could be forwarded to another location. If no acknowledgement message is received, session border controller 101 could re-transmit the transcoding instruction or take some other remedial action.

Figure 3:
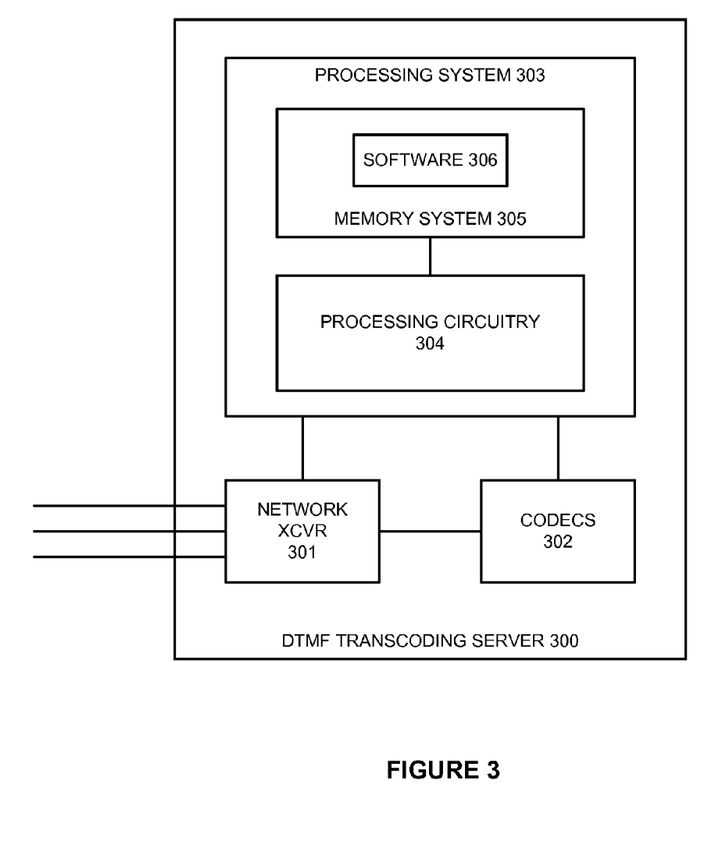
FIG. 3 illustrates a DTMF transcoding server to perform DTMF transcoding for multiple session border controllers.

FIG. 3 illustrates DTMF transcoding server 300 to perform DTMF transcoding for multiple session border controllers. DTMF transcoding server 300 is an example of DTMF transcoding server 103, although server 103 may use alternative configurations. DTMF transcoding server 300 comprises network transceiver 301, codecs 302, and processing system 303. Processing system 303 comprises processing circuitry 304 and memory system 305 that stores operating software 306. Processing system 303 is linked to transceivers 301 and codecs 302, which are also linked together. DTMF transcoding server 300 may include additional transceivers and other well-known components that are not shown for clarity, such as routers, user interfaces, computer components, databases, and power systems.

Network transceiver 301 comprises a physical communication port, signal processing circuitry, software, and/or some other communication components. Network transceiver 301 may use various protocols, such as Internet Protocol (IP), Time Division Multiplex (TDM), Ethernet, wireless, or some other network communication format—including combinations thereof. Network transceiver 301 receives user transcoding instructions and transfers corresponding transcoded DTMF signaling.

Codecs 302 comprises signal processing circuitry, software, and/or some other communication components. Codecs 302 produce DTMF signaling in various formats, such RFC 2833 and G.711. Note that DTMF signaling in a SIP information message may be produced by processing system 303 without using codecs 302, although codecs 302 could be configured to produce SIP information messages with DTMF signaling if desired.

Processing circuitry 304 comprises microprocessor and other circuitry that retrieves and executes operating software 306 from memory system 305. Memory system 305 comprises a computer-readable storage medium, such as a disk drive, flash drive, data storage circuitry, or some other memory apparatus. Memory system 305 could be a single device or be distributed across multiple devices. Processing circuitry 304 is typically mounted on one or more circuit boards that may also hold memory system 305 and portions of network transceiver 301 and codecs 302.

Operating software 306 comprises computer programs, firmware, or some other form of computer-readable processing instructions. Operating software 306 may include an operating system, utilities, drivers, network interfaces, applications, or some other type of software. For example, operating software 306 may include: 1) an instruction module to process incoming transcoding instructions an initiate transcoding operations, 2) a codec control module to drive codecs to produce the appropriate transcoded DTMF signaling, and 3) a messaging module to encapsulate the transcoded DTMF signaling in a communication packet with the appropriate addressing and information. When executed by processing circuitry 304, operating software 306 directs processing system 303 to operate DTMF transcoding server 300 as described herein. In particular, operating software 306 directs processing system 303 to transfer transcoded DTMF signaling responsive to transcoding instructions.

Figure 4:
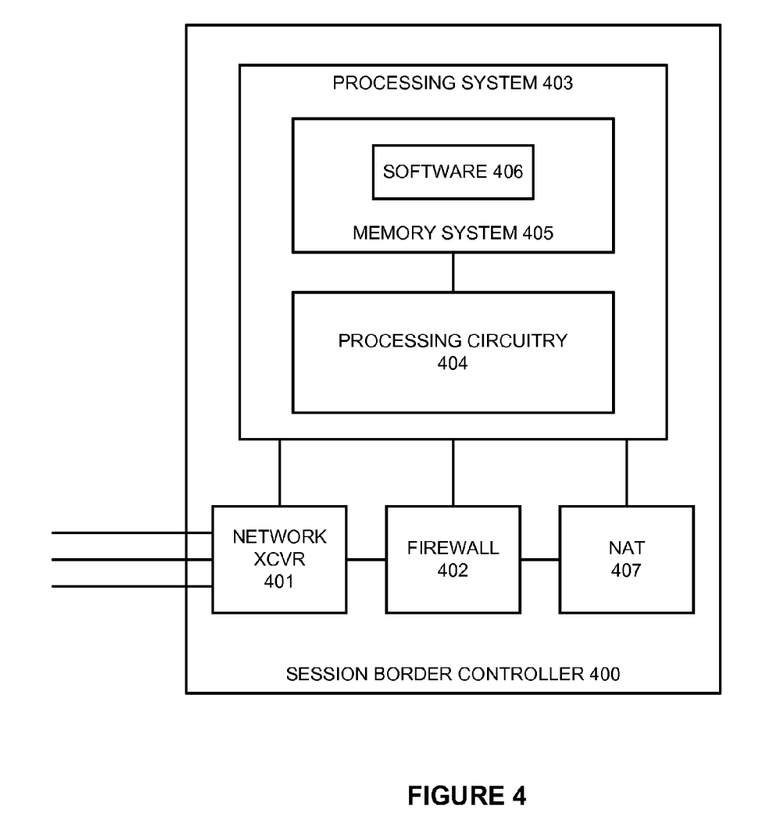
FIG. 4 illustrates a session border controller that uses a DTMF transcoding server.

FIG. 4 illustrates session border controller 400 that uses a DTMF transcoding server to perform DTMF transcoding. Session border controller 400 is an example of Session border controllers 101-102, although controllers 101-102 may use alternative configurations. Session border controller 400 comprises network transceiver 401, firewall 402, Network Address Translation (NAT) 407, and processing system 403. Processing system 403 comprises processing circuitry 404 and memory system 405 that stores operating software 406. Processing system 403 is linked to network transceiver 401, firewall 402, and NAT 407, which are also linked together. Session border controller 400 may include additional transceivers and other well-known components that are not shown for clarity, such as routers, user interfaces, computer components, databases, and power systems.

Network transceiver 401 comprises a physical communication port, signal processing circuitry, software, and/or some other communication components. Network transceiver 401 may use various protocols, such as IP, TDM, Ethernet, wireless, or some other network communication format—including combinations thereof. Network transceiver 401 exchanges communication packets and transfers transcoding instructions.

Firewall 402 comprises signal processing circuitry, software, and/or some other communication components. Firewall 402 prevents denial-of-service attacks and inhibits other forms of malicious traffic. NAT 407 translates packet addresses and port numbers. Typically, NAT 407 is used to hide addressing from external systems and to allow for more flexible internal addressing.

Processing circuitry 404 comprises microprocessor and other circuitry that retrieves and executes operating software 406 from memory system 405. Memory system 405 comprises a computer-readable storage medium, such as a disk drive, flash drive, data storage circuitry, or some other memory apparatus. Memory system 405 could be a single device or be distributed across multiple devices. Processing circuitry 404 is typically mounted on one or more circuit boards that may also hold memory system 405 and portions of network transceiver 401, firewall 402, and NAT 407.

Operating software 406 comprises computer programs, firmware, or some other form of computer-readable processing instructions. Operating software 406 may include an operating system, utilities, drivers, network interfaces, applications, or some other type of software. For example, operating software 406 may include: 1) a DTMF detection module to detect DTMF signaling, 2) a DTMF information module to determine if DTMF transcoding is required, and 3) an instruction module to generate corresponding transcoding instructions. When executed by processing circuitry 404, operating software 406 directs processing system 403 to operate session border controller 400 as described herein. In particular, operating software 406 directs processing system 403 to detect DTMF signaling, determine DTMF transcoding requirements, and generate corresponding transcoding instructions.

Figure 5:
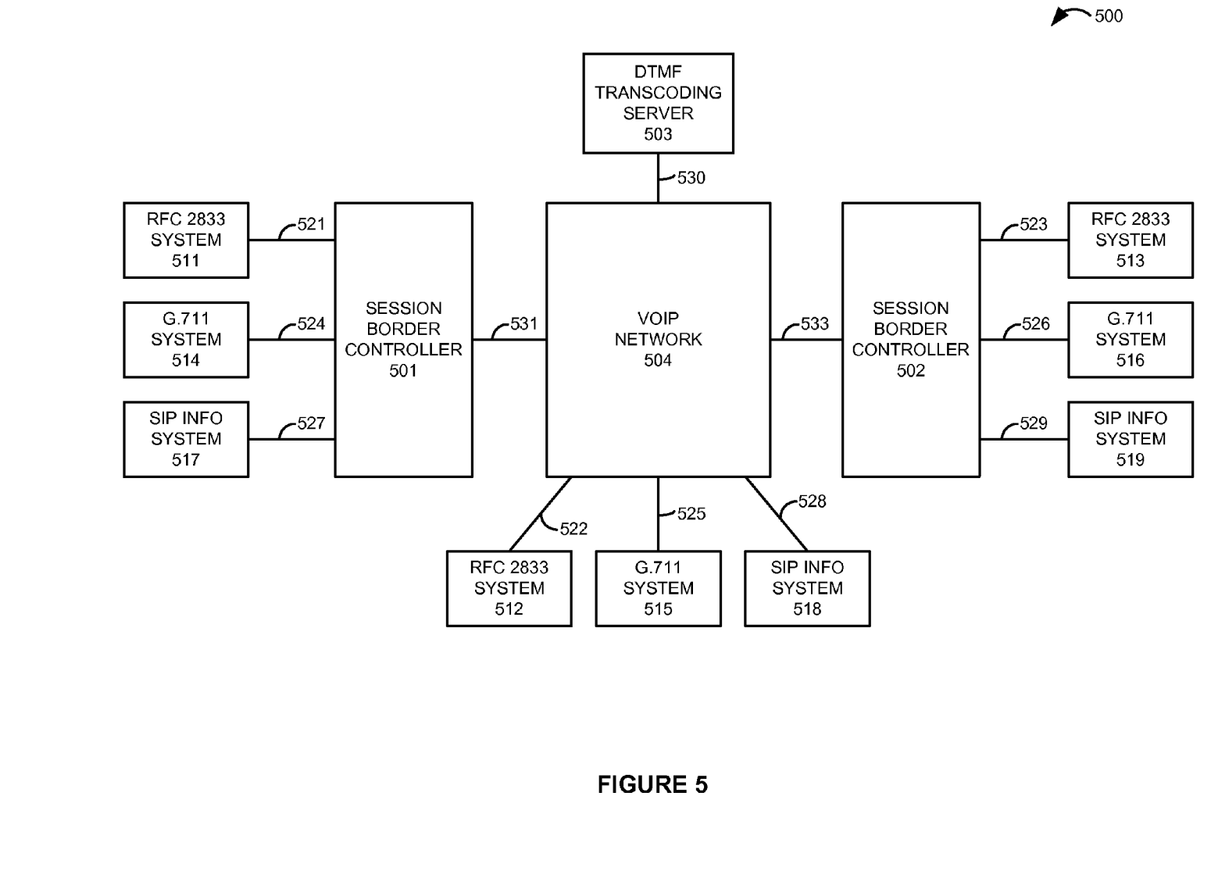
FIG. 5 illustrates a communication system where multiple session border controllers use a DTMF transcoding server for DTMF transcoding between 2833, SIP, and G.711.

FIG. 5 illustrates Voice over Internet Protocol (VoIP) communication system 500. VoIP communication system 500 is an example of communication system 100, although system 100 may use alternative configurations and operations. VoIP communication system 500 comprises session border controllers 501-502, DTMF transcoding server 503, VoIP communication network 504, RFC 2833 based communication systems 511-513, G.711 based communication systems 514-516, SIP Info based communication systems 517-519, and communication links 521-530.

RFC 2833 based communication systems 511-513 use RFC 2833 coding and transfer DTMF signaling within Real Time Protocol (RTP) VoIP packets. G.711 based communication systems 514-516 use G.711 coding to transfer DTMF signaling within RTP VoIP packets. SIP Info based communication systems 517-519 place DTMF signaling in SIP information messages that are VoIP signaling packets.

Several examples are discussed below. In some examples, DTMF transcoding server 503 is invoked. In other examples, session border controller 501 performs the DTMF transcoding. In yet other examples, no DTMF transcoding is required.

Consider a VoIP call from RFC 2833 system 511 to RFC 2833 system 512. Session border controller 501 may detect DTMF signaling, but transcoding is not required since the DTMF signaling format (2833) is the same on each side of the call. Session border controller 501 passes any DTMF signaling on the call without further transcoding action.

Consider a VoIP call from RFC 2833 system 511 to G.711 system 515. If session border controller 501 detects DTMF signaling from system 511, controller 501 determines that G.711 transcoding is required for system 515. In response, session border controller 501 sends a transcoding instruction to DTMF transcoding server 503. The transcoding instruction includes: the target transcoding type (G.711), the source address and port of session border controller 501 (after NAT traversal), the destination address and port for the destination in G.711 system 515, and the DTMF data—possibly in the 2833 format. In response to the transcoding instruction, DTMF transcoding server 503 transfers an RTP VoIP packet having the source address and port of session border controller 501, the destination address and port for G.711 system 515, and the DTMF data transcoded in the G.711 format.

Consider a VoIP call from RFC 2833 system 511 to SIP info system 518. If session border controller 501 detects DTMF signaling from system 511, controller 501 determines that SIP info transcoding is required for system 518. In response, session border controller 501 generates a SIP information message with: a content type of DTMF Relay, a signal for the DTMF data (like "3" for the number three key), and a duration of the DTMF data (like one second). Session border controller 501 transfers the SIP information message to SIP Info system 518.

Consider a VoIP call from G.711 system 514 to RFC 2833 system 512. If session border controller 501 detects DTMF signaling from system 514, controller 501 determines that RFC 2833 transcoding is required for system 512. In response, session border controller 501 sends a transcoding instruction to DTMF transcoding server 503. The transcoding instruction includes: the target transcoding type (RFC 2833), the source address and port of session border controller 501 (after NAT traversal), the destination address and port for the destination in RFC 2833 system 512, and the DTMF data—typically in the G.711 format. In response to the transcoding instruction, DTMF transcoding server 503 transfers an RTP VoIP packet having the source address and port of session border controller 501, the destination address and port for RFC 2833 system 512, and the DTMF data transcoded into the RFC 2833 format.

Consider a VoIP call from G.711 system 514 to G.711 system 515. Session border controller 501 may detect DTMF signaling, but transcoding is not required since the DTMF signaling format (G.711) is the same on each side of the call. Session border controller 501 passes any DTMF signaling on the call without further transcoding action.

Consider a VoIP call from G.711 system 514 to SIP Info system 518. If session border controller 501 detects DTMF signaling from system 514, controller 501 determines that SIP Info transcoding is required for system 518. In response, session border controller 501 sends a transcoding instruction to DTMF transcoding server 503. The transcoding instruction includes: the target transcoding type (SIP Info), the source address and port of session border controller 501 (after NAT traversal), the destination address and port for the destination in SIP Info system 518, and the DTMF data—typically in the G.711 format. In response to the transcoding instruction, DTMF transcoding server 503 transfers a SIP Info packet having the source address and port of session border controller 501, the destination address and port for SIP Info system 518, and the DTMF signals and duration in the SIP Info format.

Consider a VoIP call from SIP Info system 517 to RFC 2833 system 512. If session border controller 501 detects DTMF signaling from system 517, controller 501 determines that RFC 2833 transcoding is required. In response, session border controller 501 transfers an RTP VoIP packet having the source address and port of session border controller 501, the destination address and port for RFC 2833 system 512, and the DTMF data transcoded into the RFC 2833 format.

Consider a VoIP call from SIP Info system 517 to G.711 system 515. If session border controller 501 detects DTMF signaling from system 517, controller 501 determines that G.711 transcoding is required for system 515. In response, session border controller 501 sends a transcoding instruction to DTMF transcoding server 503. The transcoding instruction includes: the target transcoding type (G.711), the source address and port of session border controller 501 (after NAT traversal), the destination address and port for the destination in G.711 system 515, and the DTMF data. In response to the transcoding instruction, DTMF transcoding server 503 transfers an RTP VoIP packet having the source address and port of session border controller 501, the destination address and port for G.711 system 515, and the DTMF data transcoded in the G.711 format.

Consider a VoIP call from SIP Info system 517 to SIP Info system 518. Session border controller 501 may detect DTMF signaling, but transcoding is not required since the DTMF signaling format (SIP Info) is the same on each side of the call. Session border controller 501 passes any DTMF signaling on the call without further transcoding action.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system comprising:
   in each of a plurality of session border controllers, receiving communication packets transferred over communication sessions between one or more source communication systems and one or more destination communication systems, processing the communication packets to detect Dual Tone Multi-Frequency (DTMF) signaling, and if the DTMF signaling is detected, then processing DTMF information to determine if DTMF transcoding is required by the one or more destination communication systems, and if the DTMF transcoding is required, then transferring DTMF transcoding instructions from the session border controllers for delivery to a DTMF transcoding server, the transcoding instructions comprising destination addresses of the one or more destination communication systems;
   in the DTMF transcoding server, receiving and processing the DTMF transcoding instructions, and in response, transferring transcoded DTMF signaling in Session Initiation Protocol (SIP) information messages from the DTMF transcoding server for delivery to the one or more destination communication systems based on the destination addresses of the one or more destination communication systems included in the transcoding instructions, the SIP information messages comprising source addresses indicating the session border controllers.

2. The method of claim 1 wherein:
   transferring the DTMF transcoding instructions from the session border controllers comprises transferring the DTMF transcoding instructions indicating source addresses of the session border controllers.

3. The method of claim 2 wherein:
   transferring the DTMF transcoding instructions from the session border controllers comprises transferring the DTMF transcoding instructions indicating source ports of the session border controllers; and
   transferring the transcoded DTMF signaling from the DTMF transcoding server comprises transferring the transcoded DTMF signaling with the source ports of the session border controllers.

4. The method of claim 1 wherein:
   transferring the transcoded DTMF signaling from the DTMF transcoding server comprises transferring the transcoded DTMF signaling with the destination addresses for the destination communication systems that required the DTMF transcoding.

5. The method of claim 4 wherein:
   transferring the DTMF transcoding instructions from the session border controllers comprises transferring the DTMF transcoding instructions indicating destination ports for the destination communication systems that required the DTMF transcoding; and
   transferring the transcoded DTMF signaling from the DTMF transcoding server comprises transferring the transcoded DTMF signaling with the destination ports for the destination communication systems that required the DTMF transcoding.

6. The method of claim 1 wherein:
   transferring the DTMF transcoding instructions from the session border controllers comprises transferring the DTMF transcoding instructions indicating DTMF transcoding types for the destination communication systems that required the DTMF transcoding; and transferring the transcoded DTMF signaling from the DTMF transcoding server comprises using the DTMF transcoding types to generate the transcoded DTMF signaling.

7. The method of claim 1 wherein:

transferring the DTMF transcoding instructions from the session border controllers comprises transferring the DTMF transcoding instructions including tokens that represent DTMF tones; and transferring the transcoded DTMF signaling from the DTMF transcoding server comprises transferring the transcoded DTMF signaling including audio files for the DTMF tones.

8. The method of claim 1 wherein:

processing the communication packets in the session border controllers to detect the DTMF signaling comprises detecting RFC 2833 signaling; and transferring the transcoded DTMF signaling from the DTMF transcoding server comprises transferring G.711 signaling.

9. The method of claim 1 wherein receiving the communication packets comprises receiving at least some Session Initiation Protocol information messages including the DTMF signaling.

10. The method of claim 1 wherein transferring the DTMF transcoding instructions from the session border controllers comprises transferring at least some Session Initiation Protocol information messages including the DTMF transcoding instructions.

11. A communication system comprising:

a DTMF transcoding server;

a plurality of session border controllers each configured to receive communication packets transferred over communication sessions between one or more source communication systems and one or more destination communication systems, process the communication packets to detect Dual Tone Multi-Frequency (DTMF) signaling, and if the DTMF signaling is detected, then processing DTMF information to determine if DTMF transcoding is required for the one or more destination communication systems, and if the DTMF transcoding is required, then transferring DTMF transcoding instructions for delivery to the DTMF transcoding server, the transcoding instructions comprising destination addresses of the one or more destination communication systems;

in the DTMF transcoding server, receiving and processing the DTMF transcoding instructions, and in response, transferring transcoded DTMF signaling in Session Initiation Protocol (SIP) information messages from the DTMF transcoding server for delivery to the one or more destination communication systems based on the destination addresses of the one or more destination communication systems included in the transcoding instructions, the SIP information messages comprising source addresses indicating the session border controllers.

12. The communication system of claim 11 wherein:

the session border controllers are configured to transfer the DTMF transcoding instructions indicating source addresses of the session border controllers.

13. The communication system of claim 12 wherein:

the session border controllers are configured to transfer the DTMF transcoding instructions indicating source ports of the session border controllers; and the DTMF transcoding server is configured to transfer the transcoded DTMF signaling with the source ports of the session border controllers.

14. The communication system of claim 11 wherein:

the DTMF transcoding server is configured to transfer the transcoded DTMF signaling with the destination addresses for the destination communication systems that required the DTMF transcoding.

15. The communication system of claim 14 wherein:

the session border controllers are configured to transfer the DTMF transcoding instructions indicating destinations ports for the destination communication systems that required the DTMF transcoding; and the DTMF transcoding server is configured to transfer the transcoded DTMF signaling with the destination ports for the destination communication systems that required the DTMF transcoding.

16. The communication system of claim 11 wherein:

the session border controllers are configured to transfer the DTMF transcoding instructions indicating DTMF transcoding types for the destination communication systems that required the DTMF transcoding; and the DTMF transcoding server is configured to use the DTMF transcoding types to generate the transcoded DTMF signaling for the destination communication systems that required the DTMF transcoding.

17. The communication system of claim 11 wherein:

the session border controllers are configured to transfer the DTMF transcoding instructions including tokens that represents DTMF tones; and the DTMF transcoding server is configured to transfer the DTMF signaling including audio files for the DTMF tones.

18. The communication system of claim 11 wherein:

the session border controllers are configured to detect RFC 2833 signaling; and the DTMF transcoding server is configured to transfer G.711 signaling.

19. The communication system of claim 11 wherein the session border controllers are configured to receive and process at least some Session Initiation Protocol information messages that include the DTMF signaling.

20. The communication system of claim 11 wherein the session border controllers are configured to transfer at least some Session Initiation Protocol information messages including the DTMF instructions.

* * * * *